Nov. 17, 1931.    S. WISE    1,832,076
LOCK FOR SPARE RIMS
Filed March 14, 1928    2 Sheets-Sheet 2
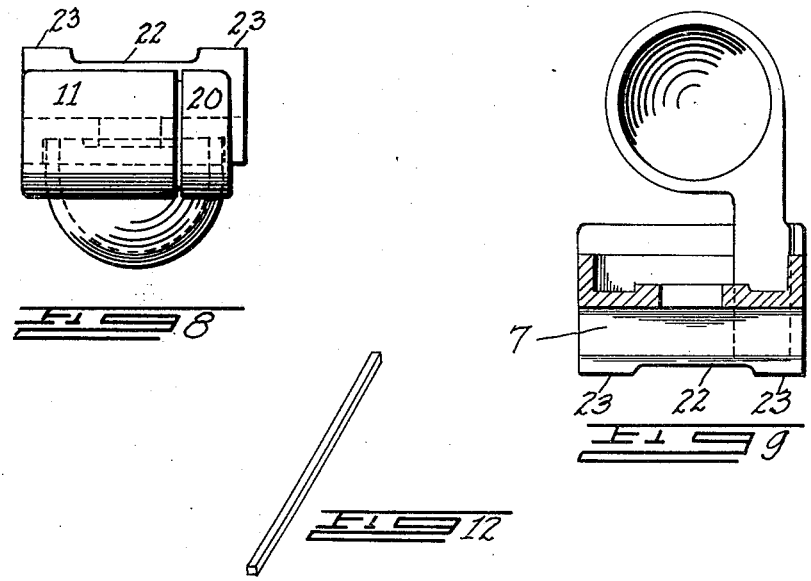
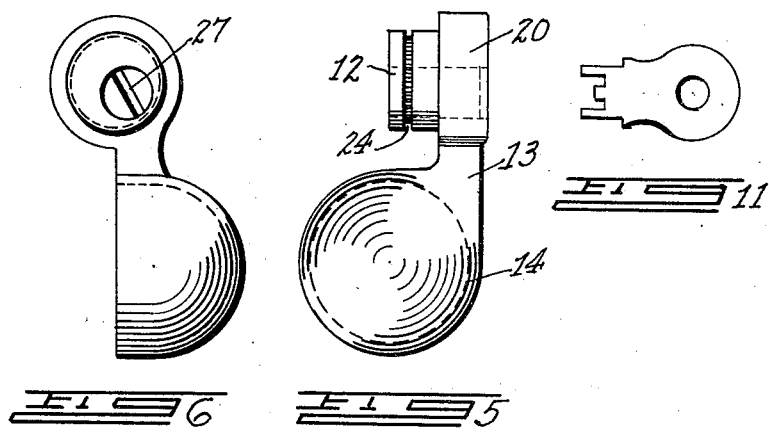
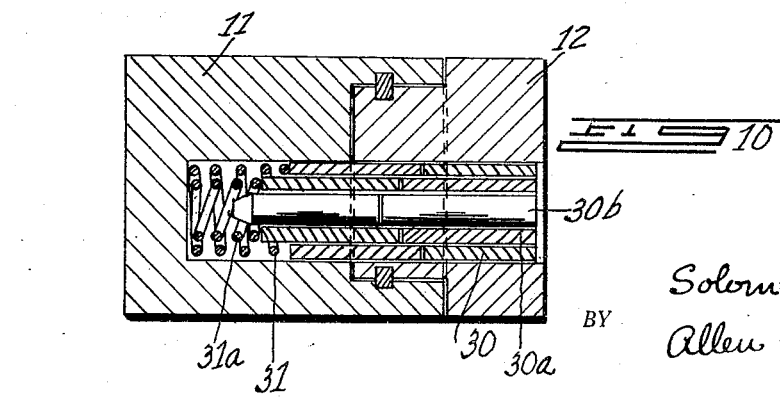
INVENTOR.
Solomon Wise
BY Allen + Allen
ATTORNEY.

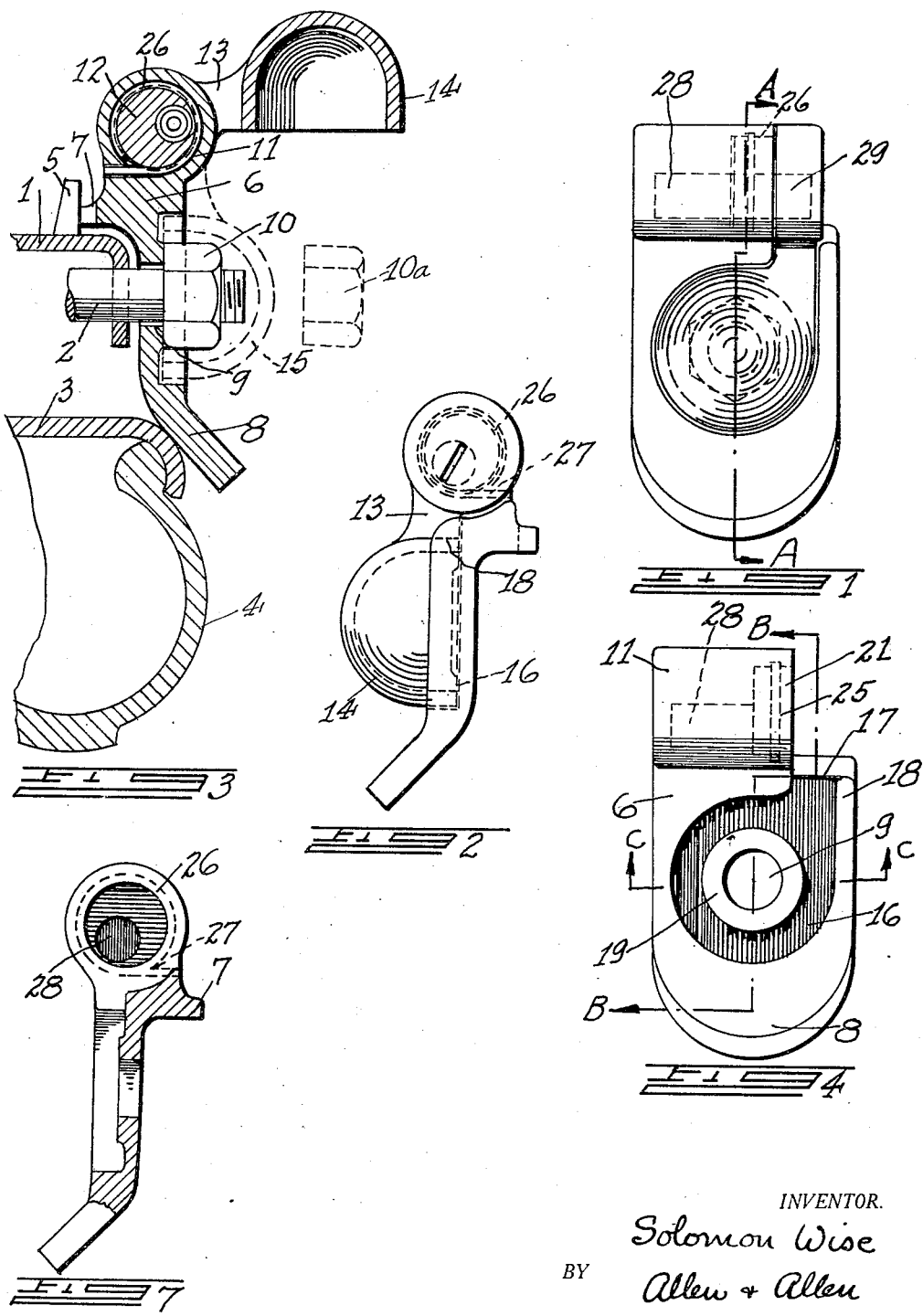

Patented Nov. 17, 1931

1,832,076

UNITED STATES PATENT OFFICE

SOLOMON WISE, OF CINCINNATI, OHIO

LOCK FOR SPARE RIMS

Application filed March 14, 1928. Serial No. 261,543.

As is well known in many types of automotive equipment, spare tires are carried on spare rims as distinguished from spare wheels and the like and these rims are held upon spare rim carriers fastened to the rear frame of the car. Provision is made in the spare rim carrier so that the rim may be seated thereon very much as it is seated upon a wheel and held in place by a lug. Several points of suspension are usually provided and of these, all except one, are substantially socket shape and serve to retain the rim. The one not thus socket shaped is the one upon which the rim is held by use of a locking lug. A threaded bolt extends outwardly from the carrier frame and upon this bolt is placed the lug, a nut thereupon being tightened upon the bolt. The lug itself, at one end bears against a portion of the rim carrier frame while its other end engages the rim and holds it in place.

My invention is directed to locking means for the spare rim.

Heretofore various means have been resorted to to lock spare rims to the carriers. The most common means comprises a lock and a chain which is passed completely about the tire rim and carrier. Another means comprises a hole through the lug bolt into which locking means of the character of a padlock, may be slipped. Again the lug itself has been provided with a hole adjacent a hole in a portion of the rim carrier frame for the purpose of enabling the owner to place the hasp of a padlock through these two holes. In some constructions where the rim carrier frame has a hole through which the air valve of the tire on the rim passes, means has been taken to lock the entire assembly together by screwing a lock upon the tire valve. Finally in some constructions cumbersome locking means have been devised to cover the lug and the bolt and to lock it in place. All of these various means are either unhandy, unsightly or involve certain other disadvantages.

It is an object of my invention to do away with extra locking devices entirely and to provide in a lug, a locking device which will prevent its removal without a key. It is an object of my invention to provide such a locking device in a neat and attractive form which will add to the appearance of the car. It is my object to provide a lock construction which will not rattle and which will do away with the necessity of chains, bands and the like. It is a further object of my invention to provide a lock which does not interfere with the ordinary operation of the bolt and which can be operated easily when it is desired to use the spare tire. These and other objects of my invention as will hereinafter appear, I accomplish by that certain construction and arrangement of parts of which I shall describe a preferred embodiment, reference being had to the drawings accompanying this specification. In the drawings:

Figure 1 shows a top view of my locking clamp.

Figure 2 is a side view thereof.

Figure 3 is a section of my lock along the lines A—A in Figure 1. In this figure there is also shown a section of the rim carrier frame and bolt of a car and a section of a spare rim and spare tire in place thereon.

Figure 4 is a view in elevation of the clamp part of my lock.

Figures 5 and 6 are different views of the locking arm part.

Figure 7 is a sectional view along the lines B—B in Figure 4.

Figure 8 is a top plan view of the lock.

Figure 9 is a semi-sectional view showing the clamp portion as though seen along the lines C—C in Figure 4 while showing the locking arm portion in upraised position.

Figure 10 is a sectional view through the barrel of my lock showing the assembly of the locking mechanism therein.

Figure 11 is a plan view of a key.

Figure 12 is a square wire used to key the parts of my lock together.

Figure 3 shows the frame of a spare rim carrier 1 and it will be understood that this frame is attached to a motor car or other piece of automotive equipment. To this tire carrier frame, there is attached a bolt 2. When the spare rim and tire is seated in the rim carrier, they will be in the positions shown at 3 and 4; in Figure 3, 3 being the rim and 4 the tire. To hold the rim in position there is slipped over the bolt 2, a clamp in ordinary practice. Upon the rim carrier frame 1, there is usually a lug 5 against which one end of the clamp may rest. This lug serves as a fulcrum for a lever action of the clamp whereby a nut screwed upon the bolt 2 will swing the clamp into position and cause it to press tightly against the rim 3 holding it rigidly upon the carrier. These are the essentials of spare rim fasteners as are well known in the art. I combine a locking mechanism with a clamp as I shall hereinafter more fully describe. Still referring to Figure 3, I have shown such a clamp 6 having a shoulder 7 adapted to rest against the lug 5 and a flange portion 8 adapted to bear against the rim. The bolt 2 passes through a hole in this clamp 6 and a nut 10 screwed thereon serves firmly to fasten the spare rim in place all in accordance with present practices.

In Figure 3 I provide however upon the upper end of my clamp a locking barrel portion 11. Pivoted in this barrel portion is a cylindrical member 12 to which is attached an arm 13 terminating in a cup shaped member 14. In dotted lines (Fig. 3) at 15 I have shown this cup shaped portion swung down so as to cover the end of the bolt 2 and the nut 10 thereon and it will be obvious that if the member 14 is locked in this position, it will be impossible for any one to remove the clamp from the rim carrier, unless such person has a key to the locking mechanism. With such a key, however, the cup shaped member 14 on the arm 13, may be swung back into the position shown in the solid lines in Fig. 3. The nut 10 may be unscrewed by means of an ordinary wrench or the like and removed from the bolt 2 as at 10a whereupon the clamp may be removed from the bolt 2 and the rim 3 and tire 4 demounted for use.

More careful consideration will now be given to the arrangement of the parts of this locking clamp. Figure 4 shows the locking clamp alone in elevation. The body 6, the up-turned flange portion 8, and the barrel portion 11 are as in Figure 3. A substantially circular recess 16 is made about the hole 9 and this recess is channeled at one side as at 17 to accommodate the arm portion of the locking arm member. This leaves at one side a lip portion 18 for a purpose which I shall presently describe. About the hole 9 I prefer to make a raised washer like portion 19 which serves as a bearing for the nut 10 when it is tightened in place. The locking arm portion is shown in two views in Figures 5 and 6, Figure 5 showing it from above and Figure 6 from the side. It will be seen that the cylindrical portion 12 is attached to a larger cylindrical portion 20 from which projects the arm 13 terminating in the cup shaped member 14.

Referring again to Figures 1 and 4, it will be seen that the cylindrical portion 12 is mounted within a cooperating cylindrical recess 21 in the barrel portion 11 and that this construction forms a pivot whereby the locking arm section may be rotated with respect to the clamp section as shown in the several figures. The construction of the clamp section is also shown in a different view in Figure 7 and a transverse section there across is shown in Figure 9. In Figure 9 also I have shown the shoulder 7 as recessed in the center at 22 and having projecting portions 23 which are necessary in adapting my lock for use with some automotive equipment. Reference now to Figures 1 and 2 will show the cooperating relationship of the parts of my lock when assembled, and particularly Figure 2 shows that the lips or edges of my cup shaped portion 14 when in locked position lie wholly within the circular recess 16 and that the lower portion of the arm 13 lying within the recess 17, is protected by the tongue 18 so that no prying instrument may be inserted at any point so as to enable a thief to secure a leverage on the locking arm member against the clamp member. It will be noted that the construction of my lock is particularly rigid and heavy although the lock itself does not have a cumbersome appearance. Even the portion whereby the locking arm is enabled to turn in the barrel section of the clamp, namely the cylinder 12 is heavy and solid in construction and gives a bearing not easily disturbed, nor can the lock be opened by prying the cylinder section 20 out of the barrel section 11. No purchase can be obtained at any place on the lock for such an attempt and the tongue 18 further abuts the arm 13 so as to prevent any endwise movement of the cylindrical portion 20. All of the views, particularly Figures 1, 2 and 8 show the compact and neat construction of my lock; the absence of angles or points at which tools might be inserted, and the generally rounded and attractive form. My lock when given a polished metallic finish or when lacquered to match a car body is an attractive addition to a motor vehicle.

There remains to be described the manner in which the cylindrical portion 12 is fastened into the cylindrical bore 21 so as to mount parts of the clamp together, and the locking means taken to prevent the relative rotation of the locking arm and the clamp parts of my device. I form about the cylindrical portion 12 as clearly shown in Figure 5, a groove preferably though not necessarily of rectangular cross section 24 and on the wall of the cylindrical bore 21 I run another such groove 25. These grooves are of such size and are placed in such a position that they form a single continuous groove when the sections are assembled one within another. This groove is shown in several of the views and indicated at 26 particularly in Figures 1, 2, 3, and 10. Connecting this groove with the outside of the lock, I drill a hole 27 through the barrel section 11 and terminating in the groove. When the cylindrical section 12 is mounted within the bore 21, I may then drive into the groove 26 a square rod wire or other malleable metallic piece 26a so as to cause it to run around the groove 26, and I then cut off this metallic piece flush with or slightly beneath the surface of the barrel section 11 so that it may not thereafter be withdrawn. It will be understood that the rod 26a lies partly within the groove 24 and partly within the groove 25 as shown in Figure 10. This serves to fix the two sections firmly but rotatably together and is the method which I prefer to use in the assembly of my lock although, as will be obvious to those skilled in the art, other methods of fastening may be used if desired, as for example, pins fastened into the wall of the portion 11 and entering the groove 24.

While a number of locking means may be used to hold the locking arm from relative rotation to the clamp, I prefer to use a type of lock comprising concentric tubular plungers operating in a cylindrical bore which is eccentric of the axis of rotation of the relatively rotatable lock parts. These tubular plungers have in them a line of cleavage such that when a key 27a is inserted through the key slot 27 in Figures 2 and 6, this line of cleavage may be made to coincide as between the several plungers and with the bottom of the cylindrical portion 12 and the bottom of the cylindrical bore 21. This concentric plunger arrangement operates in a hole 28 in the barrel section 11 extending downwardly from the bottom of the cylinder bore 21 and in a hole 29 in the sections 12 and 20 of the locking arm. When the locking arm is swung downward until the cup shaped section 14 covers and prevents access to the nut 10, i. e., until the locking device is in the locked position, the hole 28 swings in line with the hole 29 and the concentric plungers actuated by springs lying within the hole 28 are pressed outwardly into the hole 29, thereby locking the parts against relative rotation. In Figure 10, I have shown concentric plungers 30, 30a and 30b actuated by springs 31 and 31a, the plunger assembly lying within the holes 28 and 29 in the parts 11 and 12. It will be obvious that when a line of cleavage is formed between the plungers so as to coincide with the line of cleavage between the parts 11 and 12, that the locking arm may then be swung about the barrel section. It will further be clear that when the two members are swung into the position shown in Figure 2 that the locking plungers will automatically spring into place to hold the parts against relative movement. Thus no key is necessary to lock my device.

It will further be clear that when the key is inserted in the slot 27 so as to operate the lock, that the key itself when turned will turn the locking arm so as to raise the cup shaped section 14 from the nut. This section may be turned entirely back if desired so as to be completely out of the way of a wrench or other device used to loosen the nut 10.

While I have described one modification of my invention, it will be understood that various changes in the form and arrangement of various parts may be made by those skilled in the art without departing from the spirit of my invention. It will be clear also that purely for the sake of design changes in the shape of the parts may readily be made. The shape of the cup shaped member 14 may be changed, for example, to render it suggestive of the shape of a shield or monogram of a particular car and the member 14 may itself be embossed, molded or decorated with initials, insignia and the like.

Having thus described my invention, what I claim as new and desire to secure by Letters Patent, is:—

1. In a locking device for spare rims, a clamp adapted to bear against said rim, means for fastening said clamp to a member affixed to a car body, a member adapted to cover said fastening means, said member being pivotally mounted upon said clamp and locking means to prevent the removal of said member, said locking means located at the pivotal connection, and comprising at least one part adapted to be moved by a key and located in locked position in a bore common to said member and said clamp, said bore being eccentric to the axis of said pivotal connection.

2. In a locking device for spare rims, a clamp comprising a body and a flanged portion adapted to bear against a rim, means for fastening said clamp to a rim carrier, said means comprising a bolt passing through a hole in said clamp and a nut tightened thereon, a barrel section on said clamp, a member pivoted in said barrel section, said member comprising a part adapted to cover said bolt and prevent access thereto, and a locking device in said barrel to prevent rotation of said member on said pivot.

3. In a locking device for spare rims, a clamp adapted to bear against a rim, means for fastening said clamp to a rim carrier, a hollow barrel section mounted on said clamp at one end thereof, and a locking arm section with a cylindrical portion rotatably mounted in said barrel section, said locking arm comprising a portion adapted to cover said fastening means and prevent access thereto and means for locking said locking arm against rotation.

4. In a locking device for spare rims, a clamp adapted to bear against said rim, means for fastening said clamp to a rim carrier, said means comprising a bolt passing through a hole in said clamp, and a nut tightened thereon, a barrel section mounted on said clamp, said barrel section having a cylindrical bore, a locking arm section having a cylindrical projection rotatably mounted in said bore, said locking arm having a hollow cap thereon and adapted to cover and prevent access to said bolt and means for preventing the rotation of said locking arm so as to remove said cover from said bolt, said locking means located within said barrel section.

5. In a locking device for spare rims, a clamp adapted to bear against a rim, means for fastening said clamp to a rim carrier comprising a bolt passing through a hole in said clamp, and a nut tightened thereon, a barrel section at one end of said clamp, a locking arm rotatably mounted on said barrel section, said locking arm comprising a cover adapted to prevent access to said bolt when said locking arm is in closed position and means for preventing the rotation of said locking arm, said means comprising at least one spring actuated member operating in a bore in said barrel section and said locking arm, said bore being eccentric of the axis of rotation of said locking arm.

6. In a locking device for spare rims, a clamp adapted to bear against a rim, means for fastening said clamp to a rim carrier, said means comprising a bolt passing through a hole in said clamp, and a nut tightened upon said bolt, a barrel section upon one end of said clamp, a cylindrical bore therein, a locking arm having a cylindrical projection rotatably mounted in said bore, said locking arm comprising a cap section adapted to cover and close said nut, and locking means to lock said locking arm against relative rotation, said means comprising an eccentric bore in said barrel section and in said cylindrical projection on said locking arm, concentric spring pressed tubular plungers operating in said bore, said plungers having a line of cleavage therein whereby said lock may be released.

7. In a locking device for spare rims, a clamp adapted to bear against a rim, means for fastening said clamp to a rim carrier, said means comprising a bolt passing through a hole in said clamp, and a nut tightened upon said bolt, a barrel section upon one end of said clamp, a cylindrical bore therein, a locking arm having a cylindrical projection rotatably mounted in said bore, said locking arm comprising a cap section adapted to cover and close said nut, and locking means to lock said locking arm against relative rotation, said means comprising an eccentric bore in said barrel section and in said cylindrical projection on said locking arm, concentric spring pressed tubular plungers operating in said bore, said plungers having a line of cleavage therein whereby said lock may be released, said bore terminating in a key slot, whereby a key may be inserted in said slot to bring said line of cleavage in said plungers to coincide with the line of cleavage between said cylindrical bore and said cylindrical projection.

8. In a locking device for spare rims, a clamp adapted to bear against a rim, means for fastening said clamp to a rim carrier, said means comprising a bolt passing through a hole in said clamp, and a nut tightened upon said bolt, a barrel section upon one end of said clamp, a cylindrical bore therein, a locking arm having a cylindrical projection rotatably mounted in said bore, said locking arm comprising a cap section adapted to cover and close said nut, and locking means to lock said locking arm against relative rotation, said means comprising an eccentric bore in said barrel section and in said cylindrical projection on said locking arm, concentric spring pressed tubular plungers operating in said bore, said plungers having a line of cleavage therein whereby said lock may be released, said bore terminating in a key slot, whereby a key may be inserted in said slot to bring said line of cleavage in said plungers to coincide with the line of cleavage between said cylindrical bore and said cylindrical projection, and means for fastening said cylindrical projection in said cylindical bore comprising a slot in the walls of said cylindrical bore, and in the walls of said cylindrical projection, said slots adapted to coincide when said projection is inserted in said bore, a communicating hole from said slot through said barrel section and a member driven through said hole and around said slot to key said sections fixedly together.

9. In a locking device for spare rims, a clamp adapted to bear against a rim, means for fastening said clamp to a rim carrier, said means comprising a bolt passing through a hole in said clamp, and a nut tightened upon said bolt, a barrel section upon one end of said clamp, a cylindrical bore therein, a locking arm having a cylindrical projection rotatably mounted in said bore, said locking arm comprising a cap section adapted to cover and close said nut, and locking means to lock said locking arm against relative rotation, said means comprising concentric spring pressed tubular plungers operating in an eccentric bore in said barrel section and in said cylindrical projection on said locking arm, said plungers having a line of cleavage therein whereby said lock may be released, said bore terminating in a key slot, whereby a key may be inserted in said slot to bring said line of cleavage in said plungers to coincide with the line of cleavage between said cylindrical bore and said cylindrical projection, and means for fastening said cylindrical projection in said cylindrical bore comprising a slot in the walls of said cylindrical bore, and in the walls of said cylindrical projection, said slots adapted to coincide when said projection is inserted in said bore, said slot rendered accessible by a hole through said barrel section and a member driven through said hole and around said slot to key said sections fixedly together, and a depression in said clamp about said hole, said depression shaped to receive said cover member and the portion of said locking arm there adjacent whereby when said device is in locked position, it will be impossible to insert an instrument beneath said locking arm so as to exert a leverage thereon as against said clamp.

10. In a locking device for spare rims a clamp with a flanged portion at one end adapted to bear against a rim, a hole in the central portion thereof and at least one shoulder at the other end thereof to bear against a rim carrier, means for holding said rim on said carrier comprising a bolt passing through a hole in said clamp and a nut tightened thereon, a barrel section at one end of said clamp, said barrel section having a cylindrical bore, a locking arm comprising a cup shaped section to cover said nut, an arm on said cup shaped section and a cylindrical projection on said arm adapted to fit within said bore, said cylindrical section and said bore having a cooperating channel thereabout, said channel connected with the outside of said barrel section by a hole and a metallic member driven through said hole and around said channel whereby said cylindrical section is rotatably set within said bore, a depression in said lug about said hole, said depression adapted to receive the edges of said cup, a communicating depression adapted to receive the lower portion of said arm, whereby when said cup shaped member is in locked position, the edges thereof and of said arm are sunk below the surface of said lug, and means in said barrel section for locking said arm against rotation.

11. In a locking device for spare rims a clamp with a flanged portion at one end adapted to bear against a rim, a hole in the central portion thereof and at least one shoulder at the other end thereof to bear against a rim carrier, means for holding said rim on said carrier comprising a bolt passing through a hole in said clamp and a nut tightened theron, a barrel section at one end of said clamp, said barrel section having a cylindrical bore, a locking arm comprising a cup shaped section to cover said nut and arm on said cup shaped section and a cylindrical projection on said arm adapted to fit within said bore, said cylindrical section and said bore having a cooperating channel thereabout, said channel connected with the outside of said barrel section by a hole and a metallic member driven through said hole and around said channel whereby said cylindrical section is rotatably set within said bore, a depression in said clamp about said hole, said depression adapted to receive the edges of said cup, a communicating depression adapted to receive the lower portion of said arm, whereby when said cup shaped member is in locked position, the edges thereof and of said arm are sunk below the surface of said clamp, and means in said barrel section for locking said arm against rotation, said means comprising a bore in said barrel section and in said cylindrical section, said bore eccentric of the axis of rotation of said cylindrical section, and spring pressed concentric tubular plungers in said bore, a key slot in said bore, a line of cleavage in said concentric tubular plungers, whereby a key may be inserted in said key slot to bring said line of cleavage in said plungers coincident with the line of cleavage between said cylindrical section and the bottom of said bore, whereby said lock may be released.

SOLOMON WISE.